United States Patent [19]

Nardelli et al.

[11] Patent Number: 5,213,835

[45] Date of Patent: May 25, 1993

[54] METHOD FOR REMOVING PHOSPHORUS FROM MILK AND WHEY PROTEIN

[75] Inventors: Christy A. Nardelli, Westerville; Arthur J. C. L. Hogarth, Columbus; James M. Simpson, Reynoldsburg; Andre Daab-Krzykowski, Columbus; Terrence B. Mazer, Reynoldsburg, all of Ohio

[73] Assignee: Abbott Laboratories, Abbott Park, Ill.

[21] Appl. No.: 812,506

[22] Filed: Dec. 20, 1991

[51] Int. Cl.$^5$ ............................................. A23C 9/00
[52] U.S. Cl. ................... 426/580; 426/271; 426/330.2; 426/334; 426/491; 426/583; 426/587
[58] Field of Search ............ 426/580, 583, 587, 662, 426/491, 590, 330.2, 334, 271

[56] References Cited

U.S. PATENT DOCUMENTS

| | | | |
|---|---|---|---|
| 4,212,799 | 7/1980 | Nuzzolo et al. | 530/377 |
| 4,375,431 | 3/1983 | Bradford et al. | 530/378 |
| 4,395,429 | 7/1983 | Campagne et al. | 426/271 |
| 4,968,513 | 11/1990 | Watanabe et al. | 426/491 |
| 5,066,491 | 11/1991 | Stott et al. | 424/85.8 |
| 5,149,558 | 9/1992 | Little et al. | 426/588 |

FOREIGN PATENT DOCUMENTS 249548  2/1990  Japan .

*Primary Examiner*—Jeanette Hunter
*Assistant Examiner*—Helen Pratt
*Attorney, Agent, or Firm*—Lonnie R. Drayer; Donald O. Nickey

[57] ABSTRACT

A method of separating phosphorus from condensed skim milk and from whey protein involves exposing the respective starting material to alumina particles while the starting material has a pH in the range of about 6.0 to 6.5. The alumina particles may be conditioned prior to use by exposing the particles to a solution containing a sulfate moiety. Both batch and continuous methods are disclosed.

6 Claims, 4 Drawing Sheets

METHOD FOR REMOVING PHOSPHORUS FROM MILK AND WHEY PROTEIN

FIELD OF THE INVENTION

The present invention relates generally to a method of removing phosphorus from condensed skim milk and whey protein using alumina.

BACKGROUND OF THE INVENTION

It is believed to be nutritionally advantageous to provide nutritional products for newborns and infants with a ratio of calcium to phosphorus that mimics the ratio in human milk. Whey protein and condensed skim milk are used as sources of protein in such products, but naturally contain more phosphorus than desired.

Aluminum is known to form complexes with phosphates. Classically, aluminum sulfate, commonly known as alum, has been used to remove inorganic phosphates in water purification processes. Alumina is insoluble in water, practically insoluble in organic solvents, and only slightly soluble in aqueous alkaline solutions with the formation of hydroxides. The ability of the aluminum portion of the aluminum oxide to attach to the phosphorus was the theoretical and practical basis for its initial experimental use in the reduction of phosphorus in condensed skim milk and whey protein.

The method disclosed wherein has been found to have utility for removing phosphorus from condensed skim milk and whey protein by exposing these substances to alumina. Methods of enhancing the phosphorus removing capacity of alumina are also disclosed.

BRIEF DESCRIPTION OF THE DRAWINGS

The features of the present invention which are believed to be novel are set forth with particularity in the appended claims. The present invention, both as to its structure and manner of operation, may best be understood by reference to the following detailed description, taken in accordance with the accompanying drawings in which:

DETAILED DESCRIPTION OF THE INVENTION

Condensed ski milk and whey protein concentrate samples were prepared using a nitric acid/hydrogen peroxide wet ash technique prior to the determination of calcium and/or phosphorus using Inductively Coupled Argon Plasma Spectrometry (ICP). Protein determinations were made using a Tecator Kjeldahl protein method similar to AOAC method 984.27.

EXPERIMENT NUMBER 1

An experiment was conducted to determine if phosphorus could be removed from condensed skim milk (CSM). To four separate 180 g samples of CSM were added 1.0, 5.0, 25.0, and 40.0 g, respectively, of alumina (Universal Scientific Activity II-III Alumina from Universal Scientific Corp., Atlanta, Ga.) which has been treated sequentially with 2% sodium hydroxide for about 10 minutes and 10% sulfuric acid for about 10 minutes. The pH of CSM was adjusted to 6.0–6.5 and the mixture was agitated for ten minutes. After allowing the slurry to settle in a refrigerator for about two hours, the CSM was centrifuged, then analyzed for phosphorus and protein content.

Figure 1:
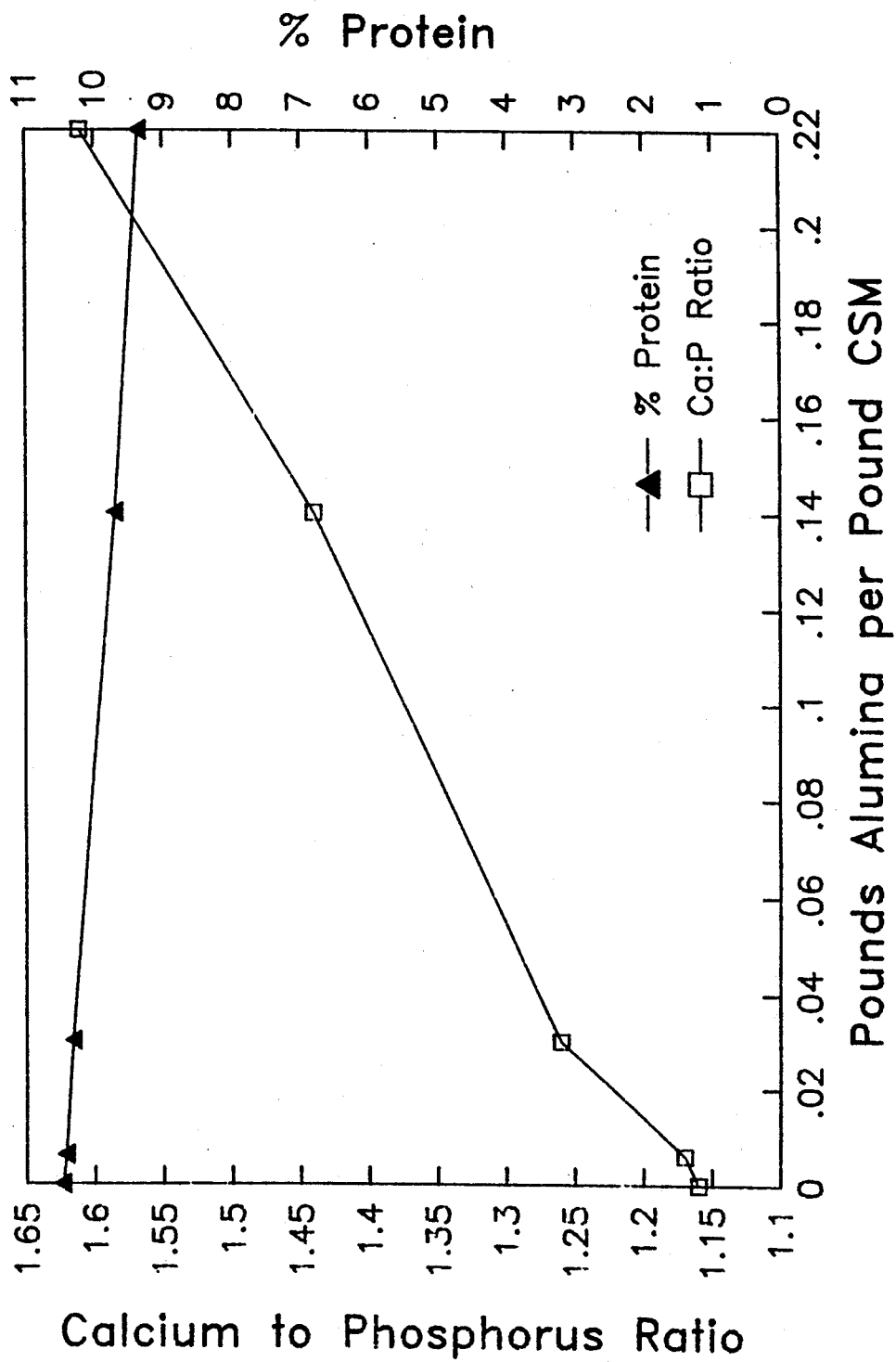
FIG. 1 is a graph showing the effect of alumina treatment on the calcium to phosphorus ratio in condensed skim milk.

Condensed skim milk (CSM) which was treated with alumina showed a reduction in phosphorus level. Although no work was done to optimize this process, a reduction in phosphorus of over 46% was achieved, while protein levels changed from 10.5% to 9.4%, only an 11% loss in protein over all. This results in an improved calcium phosphorous ratio of from 1.16 in the control (untreated CSM) to 1.61 in the CSM treated with the most alumina (FIG. 1). Although the aluminum content does increase with this treatment, it is believed that this obstacle may be overcome by process optimization. Treatment of CSM with alumina could be employed to improve calcium-to-phosphorus ratios in products such as nutritional formulas for infants. The high phosphorus levels of CSM had previously been an obstacle to improvement of the calcium-to-phosphorus levels in infant nutritional formulas.

EXPERIMENT NUMBER 2

Alcoa F1 alumina (Aluminum Company of America-Vidalia LA) treated sequentially with sodium hydroxide and sulfuric acid, as described in Experiment 1, was added in varying amounts to a 30% whey protein concentrate slurry. The whey protein used was obtained from Milei in Germany. Samples were agitated for about 10 minutes, refrigerated for 1 hour, and then centrifuged at about 1700 RPM for about 15 minutes. Samples were then analyzed for protein and phosphorus.

Figure 2:
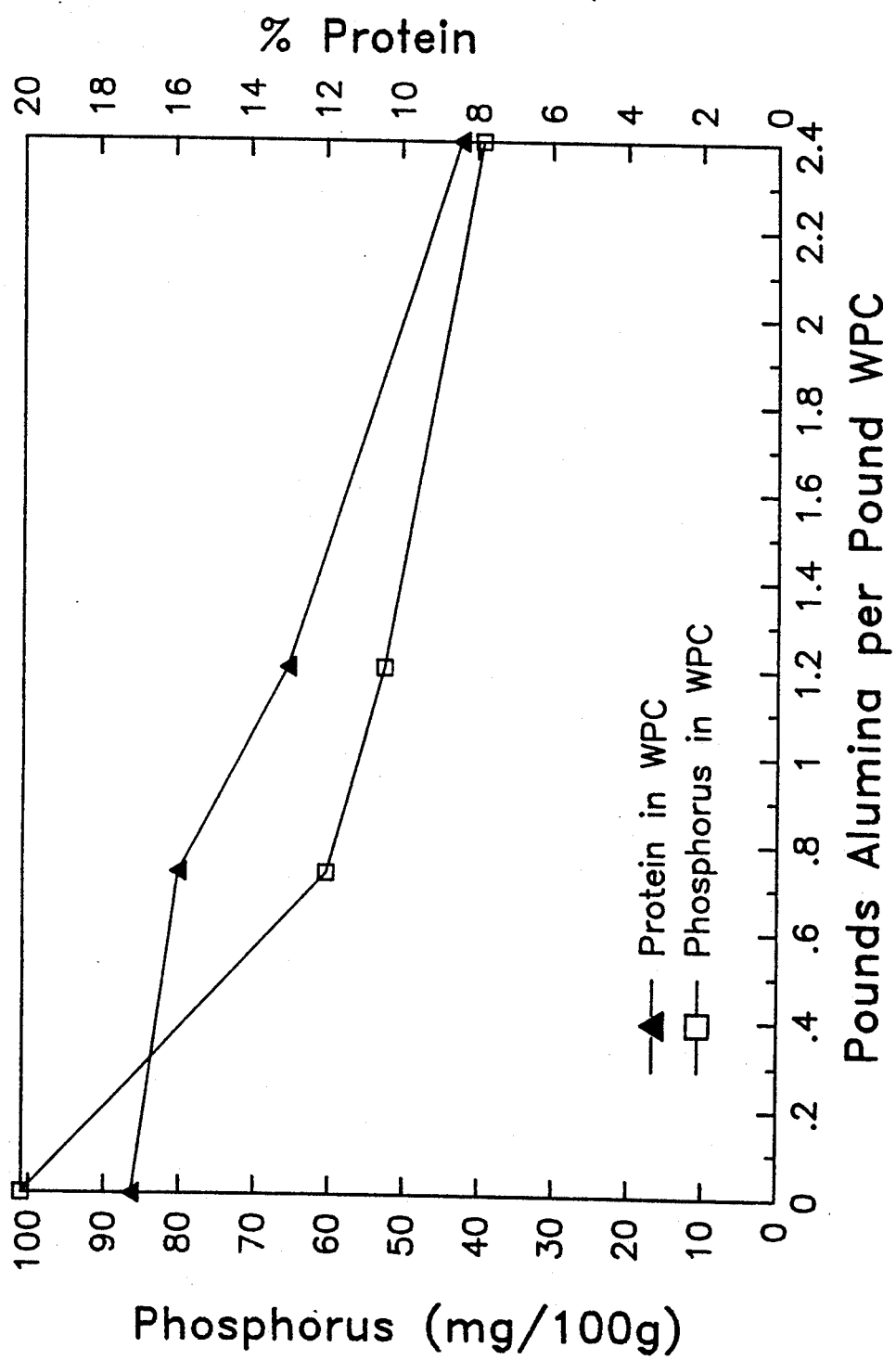
FIG. 2 is a graph showing the effect of sodium hydroxide/sulfuric acid treated alumina on removing phosphorus from whey protein.

Results of this experiment are illustrated in FIG. 2. Phosphorus was removed from whey protein using the alumina treatment procedure. This figure shows that, while there was some protein loss evident, there was a marked reduction in the phosphorus content.

EXPERIMENT 3

The effectiveness of alumina treated with 25% potassium sulfate instead of sulfuric acid and 0.4% calcium sulfate instead of sulfuric acid was evaluate. As it was believed that the low pH of the sulfuric acid treatment may cause alumina particle degradation, the relatively neutral pH of a sulfate salt treatment may prove beneficial to stability of the alumina particle. Whey protein and condensed skim milk, were treated with varying levels of alumina which had been conditioned with sodium hydroxide and potassium sulfate for comparison with samples treated with sodium hydroxide and sulfuric acid-treated alumina. Condensed skim milk was also treated with alumina conditioned with sodium hydroxide and calcium hydroxide. Samples were analyzed for calcium, phosphorus, and protein content and compared to untreated "control" samples.

Figure 3:
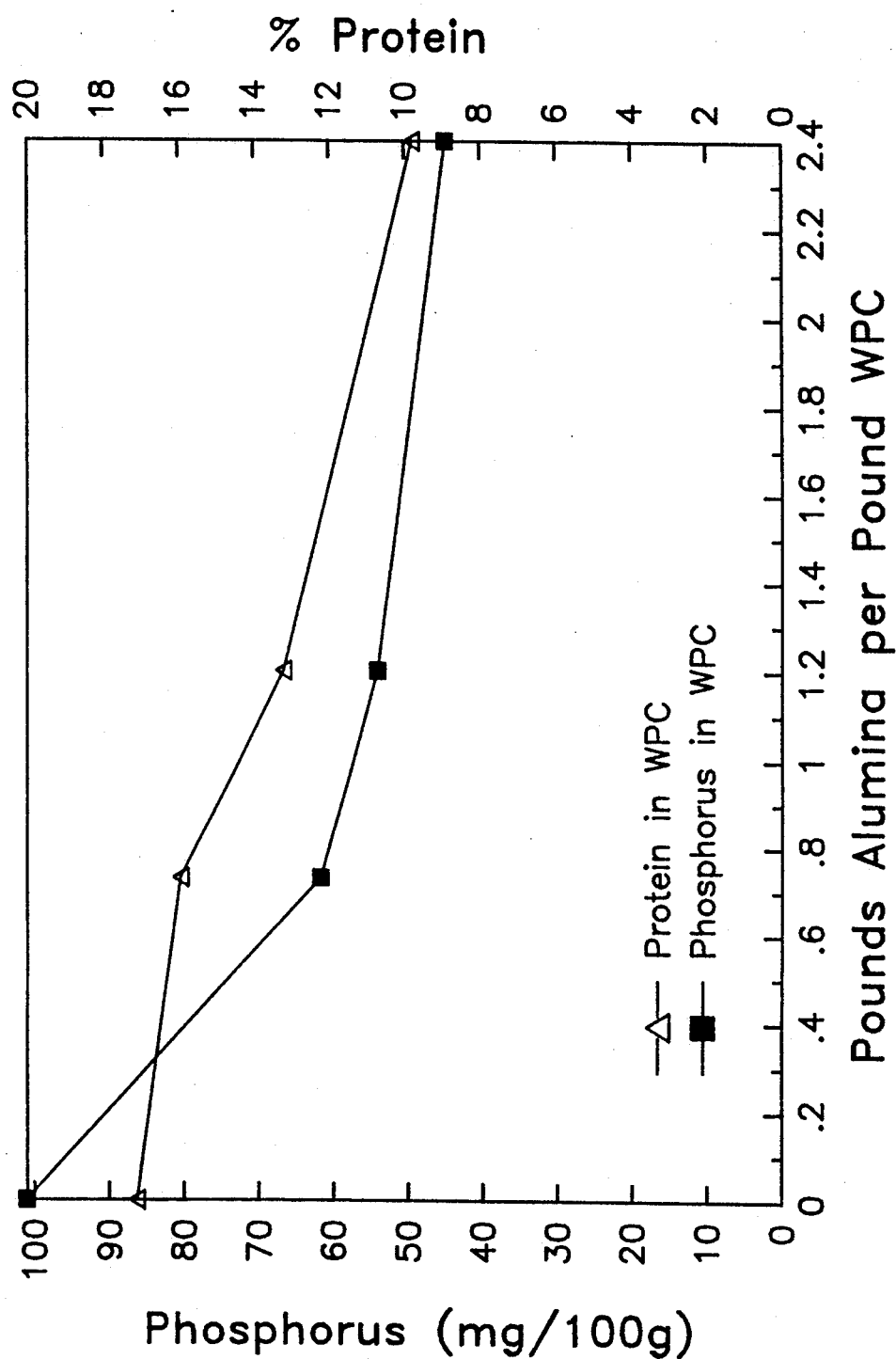
FIG. 3 is a graph showing the effect of sodium hydroxide/potassium sulfate treated alumina on removing phosphorus from whey protein.
Figure 4:
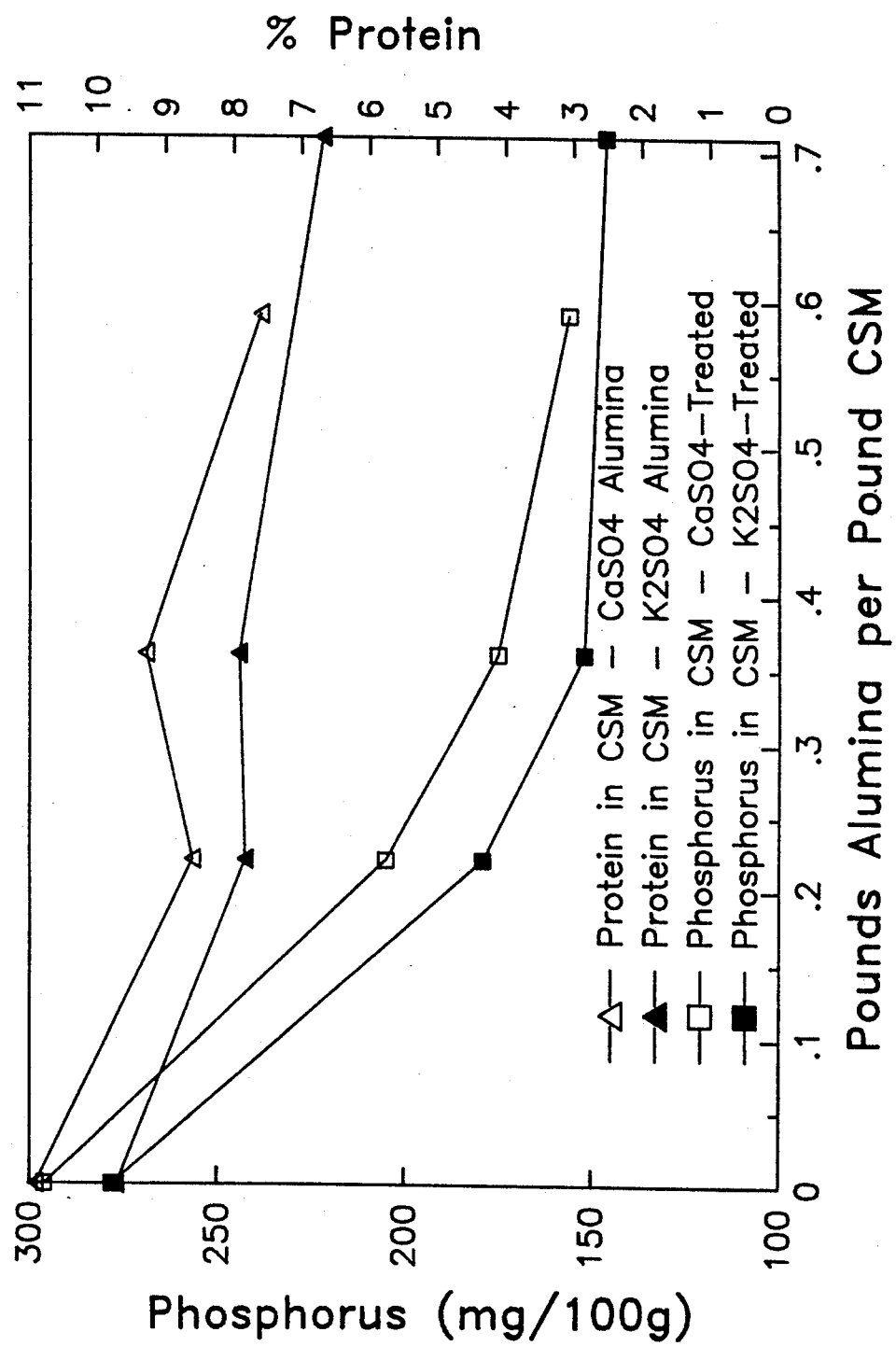
FIG. 4 is a graph showing the effect of sodium hydroxide/potassium sulfate and sodium hydroxide/calcium sulfate treated aluminas on removing phosphorus from condensed skim milk.

Results of studies using potassium sulfate-treated and calcium sulfate-treated alumina for phosphate removal from whey protein and condensed skim milk, are included in FIGS. 3 and 4. These figures illustrate significant phosphorus removal from these materials, with minimal protein loss. This experiment proved the applicability of the alumina treatment process for reduction of minerals in other protein sources.

It is believed that in a best mode of practicing the present invention the alumina particles are reconditioned after use by exposing the particles to a solution containing a sulfate moiety, and thus using the same particles to practice the disclosed procedure again. This reconditioning makes the procedure much more economical.

While the experiments were performed using batch technology wherein the alumina particles were placed in a batch of the starting material, the invention may also be practiced by causing the starting material to pass through a structure, such as a column, which contains alumina particles and has at least one inlet and one outlet to facilitate a more continuous process.

While certain representative embodiments and details have been shown for the purpose of illustrating the invention, it will be apparent to those skilled in the art that various changes and modifications may be made therein without departing from the spirit and scope of the invention.

We claim:

1. A method of separating phosphorus from condensed skim milk comprising the steps of:
   (a) providing condensed skim milk;
   (b) placing the condensed skim milk in contact with particles of alumina for a period of time, said alumina particles having been conditioned with a solution containing a sulfate moiety prior to contact with the condensed skim milk, with the condensed skim milk for at least a portion of the contact period having a pH in the range of about 6.0 to 6.5; and
   (c) thereafter separating the condensed skim milk from the particles of alumina.

2. A method of separating phosphorus from condensed skim milk according to claim 1 wherein step (b) comprises placing alumina particles in the condensed skim milk.

3. A method of separating phosphorous from whey protein comprising the steps of:
   (a) providing a liquid medium containing whey protein;
   (b) placing the liquid medium containing whey protein in contact with particles of alumina for a period of time, said alumina particles having been conditioned with a solution containing a sulfate moiety prior to contact with the liquid medium containing whey protein, with the liquid medium containing whey protein for at least a portion of the contact period having a pH in the range of about 6.0 to 6.5; and
   (c) thereafter separating the liquid medium containing whey from the particles of alumina.

4. A method of separating phosphorus from whey protein according to claim 3 wherein step (b) comprises placing alumina particles in the liquid medium containing whey protein.

5. A method of separating phosphorus from condensed skim milk according to claim 1 wherein step (b) comprises (i) providing a structure which contains particles of alumina and has at least one inlet and one outlet, and (ii) passing the skim milk through the inlet into the structure such that the skim milk contacts the particles of alumina, and step (c) comprises separating the skim milk from the particles of alumina and passing the skim milk through the exit.

6. A method of separating phosphorus from whey protein according to claim 3 wherein step (b) comprises (i) providing a structure which contains particles of alumina and has at least one inlet and one outlet, and (ii) passing the liquid medium containing whey protein through the inlet into the structure such that the liquid medium containing whey protein contacts the particles of alumina, and step (c) comprises separating the liquid medium containing whey protein from the particles of alumina and passing the liquid medium containing whey protein through the exit.

* * * * *

UNITED STATES PATENT AND TRADEMARK OFFICE
CERTIFICATE OF CORRECTION

PATENT NO. : 5,213,835

DATED : May 25, 1993

INVENTOR(S) : Christy A. Nardelli, et al

It is certified that error appears in the above-indentified patent and that said Letters Patent is hereby corrected as shown below:

Column 1, line 58, "ski" should be --skim--
Column 2, line 4, "has" should be --had--
Column 2, line 51, "evaluate" should be --evaluated--
Column 3, line 9, "thus" should be --then--

Signed and Sealed this

Nineteenth Day of April, 1994

Attest:

BRUCE LEHMAN

Attesting Officer

Commissioner of Patents and Trademarks